(12) United States Patent
Hopgood et al.

(10) Patent No.: US 9,886,402 B2
(45) Date of Patent: *Feb. 6, 2018

(54) EQUALIZATION COEFFICIENT SEARCH ALGORITHM

(71) Applicant: NVIDIA CORPORATION, Santa Clara, CA (US)

(72) Inventors: Michael Hopgood, San Jose, CA (US); Robert Huang, Fremont, CA (US); Vishal Mehta, San Jose, CA (US); Hitendra Dutt, Sunnyvale, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 467 days.

This patent is subject to a terminal disclaimer.

(21) Appl. No.: 13/722,240

(22) Filed: Dec. 20, 2012

(65) Prior Publication Data
US 2014/0181339 A1 Jun. 26, 2014

(51) Int. Cl.
*G06F 13/20* (2006.01)
*G06F 13/38* (2006.01)

(52) U.S. Cl.
CPC ............ *G06F 13/20* (2013.01); *G06F 13/385* (2013.01)

(58) Field of Classification Search
CPC . G06F 13/20; G06F 13/385; H04L 25/03057; H04L 25/03885; H04L 2025/03535; H04L 25/03038; H04L 1/0001; H04L 1/20; H04L 2025/03617; H04L 25/03343; H04L 2025/03503; H04L 2025/03636; H04L 2025/0377; G11C 11/5635; G11C 16/16; G11C 16/344

See application file for complete search history.

(56) References Cited

U.S. PATENT DOCUMENTS

| | | | | |
|---|---|---|---|---|
| 8,644,369 | B1 * | 2/2014 | Katic | H04L 25/03038 375/232 |
| 8,705,602 | B1 * | 4/2014 | Ding | H04L 25/03038 375/229 |
| 8,942,334 | B1 * | 1/2015 | Zortea | H04L 7/0334 375/355 |
| 2007/0110148 | A1 * | 5/2007 | Momtaz | H03L 7/0814 375/232 |
| 2008/0094107 | A1 * | 4/2008 | Dallaire | H03K 5/2481 327/63 |
| 2009/0154626 | A1 * | 6/2009 | Anderson et al. | 375/360 |
| 2009/0304054 | A1 * | 12/2009 | Tonietto | H04L 1/205 375/221 |

(Continued)

*Primary Examiner* — Hirdepal Singh
(74) *Attorney, Agent, or Firm* — Artegis Law Group, LLP

(57) ABSTRACT

A method comprises selecting a starting point on a map of equalization coefficients and measuring an eye height of a signal transmitted using the set of equalization coefficients associated with the starting point and an eye height associated with each adjacent point on the map relative to the starting point. The eye height associated with an adjacent point is based on a signal transmitted using the set of equalization coefficients associated with the adjacent point. The method also comprises walking on the map in a first direction from the starting point to the adjacent point associated with the greatest eye height, wherein the eye height associated with the adjacent point is greater than or equal to the eye height associated with the starting point.

22 Claims, 13 Drawing Sheets

(56) References Cited

U.S. PATENT DOCUMENTS

| | | | |
|---|---|---|---|
| 2010/0177816 A1* | 7/2010 | Malipatil | H04L 25/03343 375/233 |
| 2011/0257953 A1* | 10/2011 | Li | G06F 17/5009 703/14 |
| 2012/0044983 A1* | 2/2012 | Kerr | H04L 25/03057 375/233 |
| 2013/0010854 A1* | 1/2013 | Sawey | H04L 25/028 375/231 |
| 2013/0287088 A1* | 10/2013 | Mobin et al. | 375/233 |
| 2014/0079111 A1* | 3/2014 | Hui et al. | 375/234 |
| 2014/0149629 A1* | 5/2014 | Cranford et al. | 710/313 |
| 2014/0269881 A1* | 9/2014 | He et al. | 375/231 |
| 2014/0294055 A1* | 10/2014 | Pustovalov | H04L 25/0236 375/232 |

\* cited by examiner

FIG. 7

| PS | DE BOOST | 0/24 | 1/24 | 2/24 | 3/24 | 4/24 | 5/24 | 6/24 | 7/24 | 8/24 |
|---|---|---|---|---|---|---|---|---|---|---|
| | 0/24 | 0.0 / 0.0<br>0.0 / 0.0 | 0.0 -0.8<br>0.8 | 0.0 -1.6<br>1.6 | 0.0 -2.5<br>2.5 | 0.0 -3.5<br>3.5 | 0.0 -4.7<br>4.7 | 0.0 -6.0<br>6.0 | 0.0 -7.6<br>7.6 | 0.0 -9.5<br>9.5 |
| | 1/24 | 0.8 0.0<br>0.8 | 0.8 -0.8<br>1.6 | 0.9 -1.7<br>2.5 | 1.0 -2.8<br>3.5 | 1.2 -3.9<br>4.7 | 1.3 -5.3<br>6.0 | 1.6 -6.8<br>7.6 | 1.9 -8.8<br>9.5 | |
| | 2/24 | 1.6 / 0.0<br>1.6 | 1.7 -0.9<br>2.5 | 1.9 -1.9<br>3.5 | 2.2 -3.1<br>4.7 | 2.5 -4.4<br>6.0 | 2.9 -6.0<br>7.6 | 3.5 -8.0<br>9.5 | | |
| $C_{-1}$ | 3/24 | 2.5 / 0.0<br>2.5 | 2.8 -1.0<br>3.5 | 3.1 -2.2<br>4.7 | 3.5 -3.5<br>6.0 | 4.1 -5.1<br>7.6 | 4.9 -7.0<br>9.5 | | | |
| | 4/24 | 3.5 / 0.0<br>3.5 | 3.9 -1.2<br>4.7 | 4.4 -2.5<br>6.0 | 5.1 -4.1<br>7.6 | 6.0 -6.0<br>9.5 | | | | |
| | 5/24 | 4.7 0.0<br>4.7 | 5.3 -1.3<br>6.0 | 6.0 -2.9<br>7.6 | 7.0 -4.9<br>9.5 | | | | | |
| | 6/24 | 6.0 0.0<br>6.0 | 6.8 -1.6<br>7.6 | 8.0 -3.5<br>9.5 | | | | | | |

$C_{+1}$

MIN REDUCED SWING LIMIT

FULL SWING LIMIT OR MAX REDUCED SWING LIMIT

FIG. 8A

| Precursor | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Postcursor 1 | | | | | | | | | | | | | | | | | |
| 2 | | | 3 | 3 | 4 | | | | | | | | | | | | |
| 3 | | | 4 | 5 | 6 | 7 | 8 | 8 | 6 | 7 | | | | | | | |
| 4 | | | 2 | 1 | 4 | | | 9 | 10 | 9 | 8 | | | | | | |
| 5 | | | | | | | | 11 | 12 | 11 | | | | | | | |
| 6 | | | | | | | | | 14 | | | | | | | | |
| 7 | | | | | | | | | 17 | | | | | | | | |
| 8 | | | | | | | | 11 | 18 | 16 | | | | | | | |
| 9 | | | | | | | | 12 | 19 | 3 | | | | | | | |
| 10 | | | | | | | | 13 | 14 | 16 | | | | | | | |
| 11 | | | | | | | | | | | | | | | | | |
| 12 | | | | | | | | | | | | | | | | | |
| 13 | | | | | | | | | | | | | | | | | |
| 14 | | | | | | | | | | | | | | | | | |
| 15 | | | | | | | | | | | | | | | | | |
| 16 | | | | | | | | | | | | | | | | | |
| 17 | | | | | | | | | | | | | | | | | |

FIG. 10

EQUALIZATION COEFFICIENT SEARCH ALGORITHM

BACKGROUND OF THE INVENTION

Field of the Invention

The present invention generally relates to data transmissions, and, more specifically, to an approach for performing channel equalization training using an equalization coefficient search algorithm.

Description of the Related Art

A typical data connector, such as a peripheral component interface (PCI) or PCI express (PCIe), allows different processing units within a computer system to exchange data with one another. For example, a conventional computer system could include a central processing unit (CPU) that exchanges data with a graphics processing unit (GPU) across a PCIe bus.

When a signal is transmitted across the data connector on a transmission channel, some frequency components may be attenuated more than others, which can make the signal illegible at the receiving end. As transmission speeds get faster, the transmissions can become more prone to errors as the noise effects are more severe. In high-speed transmission channels, the signal quality is critically important. One technique to combat this tendency is to "equalize" the channel so that the frequency domain attributes of the signal at the input end are faithfully reproduced at the output end, resulting in fewer errors. High-speed serial communications protocols like PCIe use equalizers to prepare data signals for transmission.

Equalization can be performed on both the transmit end and the receive end of a channel. For transmit equalization, the signal can be reshaped at the transmit end before the signal is sent to attempt to overcome the distortion that will be introduced by the channel. At the receive end, the signal can be reconditioned to improve the signal quality.

For transmit equalization in PCIe, two parameters known as equalization coefficients can be used to tune the transmitter. A typical system may have hundreds of combinations of equalization coefficients, and some of these combinations will produce better equalization results than others. The signal quality is critically important in high-speed transmission channels, so an optimal set of coefficients is crucial to ensure accurate transmissions. During the equalization process, one combination of coefficients must be selected that meets the performance requirements of the system. In addition, selecting this combination must be done within a fixed time limit so that the system can boot up or begin other processes. Testing every combination of coefficients to find the best one is unfeasible, as this approach will usually take too much time. Additionally, current approaches used to test a subset of combinations of coefficients will often lead to selecting a suboptimal combination.

Accordingly, what is needed in the art is a technique that tests and selects equalization coefficients for a high-speed bus in a more efficient manner.

SUMMARY OF THE INVENTION

One embodiment of the present invention sets forth a method for analyzing equalization coefficients for a high-speed data bus. The method comprises selecting a starting point on a map of equalization coefficients and measuring an eye height of a signal transmitted using the set of equalization coefficients associated with the starting point and an eye height associated with each adjacent point on the map relative to the starting point. The eye height associated with an adjacent point is based on a signal transmitted using the set of equalization coefficients associated with the adjacent point. The method also comprises walking on the map in a first direction from the starting point to the adjacent point associated with the greatest eye height, wherein the eye height associated with the adjacent point is greater than or equal to the eye height associated with the starting point.

Advantageously, selecting equalization coefficients using the above techniques allows for faster selection of coefficients that meet the quality criteria required by the system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7 is an illustration of a map of equalization coefficients according to one embodiment of the present invention;

FIGS. 8A and 8B illustrate one technique for performing a coarse grain search on a map of equalization coefficients according to one embodiment of the present invention;

FIG. 10 is an illustration of a technique for performing a fine grain search on a map of equalization coefficients according to one embodiment of the present invention;

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
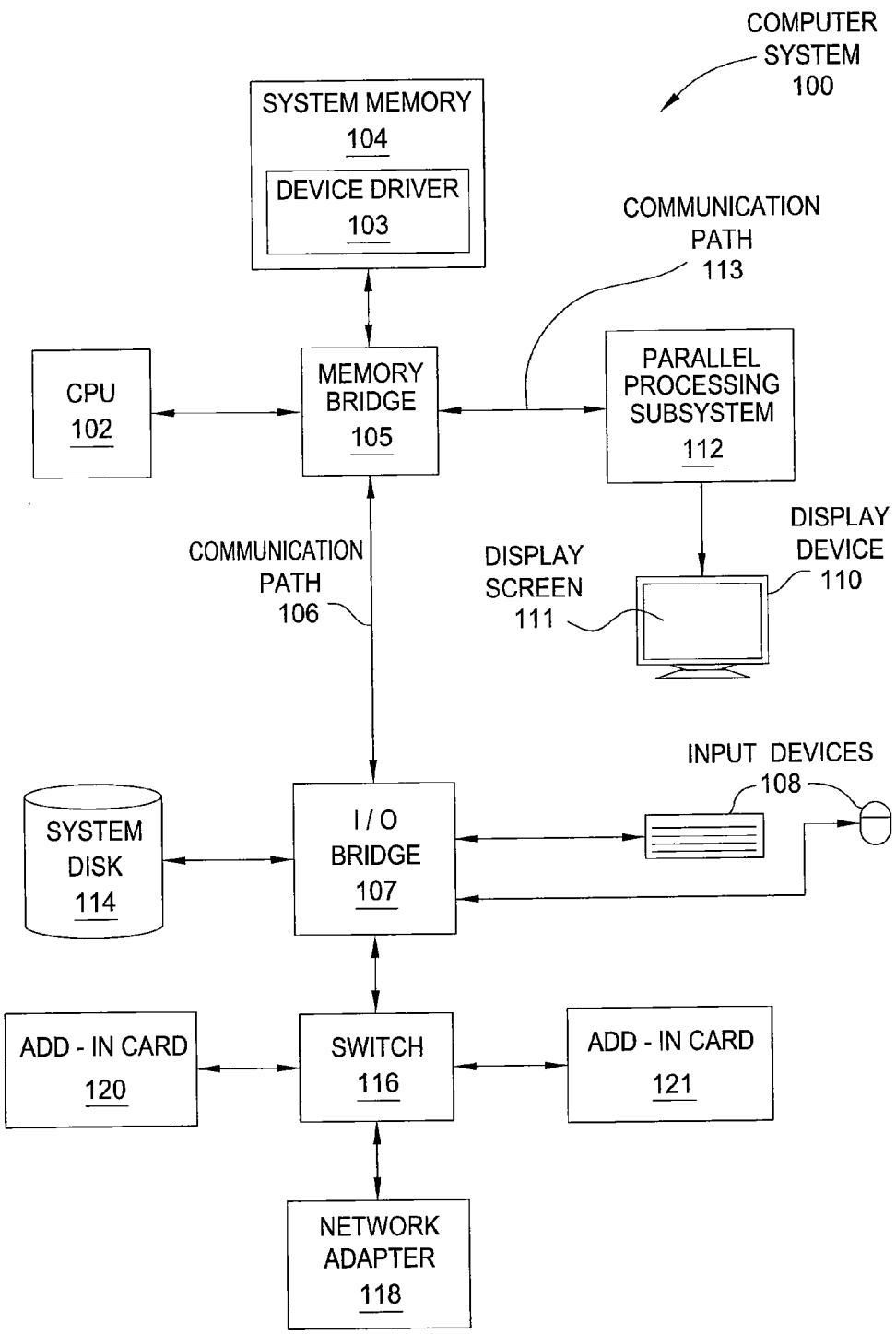
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 that includes a device driver 103. CPU 102 and system memory 104 communicate via an interconnection path that may include a memory bridge 105. Memory bridge 105, which may be, e.g., a Northbridge chip, is connected via a bus or other communication path 106 (e.g., a HyperTransport link) to an input/output (I/O) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a peripheral component interconnect (PCI) express, Accelerated Graphics Port (AGP), or HyperTransport link); in one embodiment parallel processing subsystem 112 is a graphics subsystem that delivers pixels to a display device 110 (e.g., a conventional cathode ray tube (CRT) or liquid crystal display (LCD) based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. Communication paths interconnecting the various components in FIG. 1 may be implemented using any suitable protocols, such as PCI, PCI Express (PCIe), AGP, HyperTransport, or any other bus or point-to-point communication protocol(s), and connections between different devices may use different protocols as is known in the art.

PPU 112 is configured to execute a software application, such as e.g. device driver 103, that allows PPU 112 to generate arbitrary packet types that can be transmitted across communication path 113. Those packet types are specified by the communication protocol used by communication path 113. In situations where a new packet type is introduced into the communication protocol (e.g., due to an enhancement to the communication protocol), PPU 112 can be configured to generate packets based on the new packet type and to exchange data with CPU 102 (or other processing units) across communication path 113 using the new packet type.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
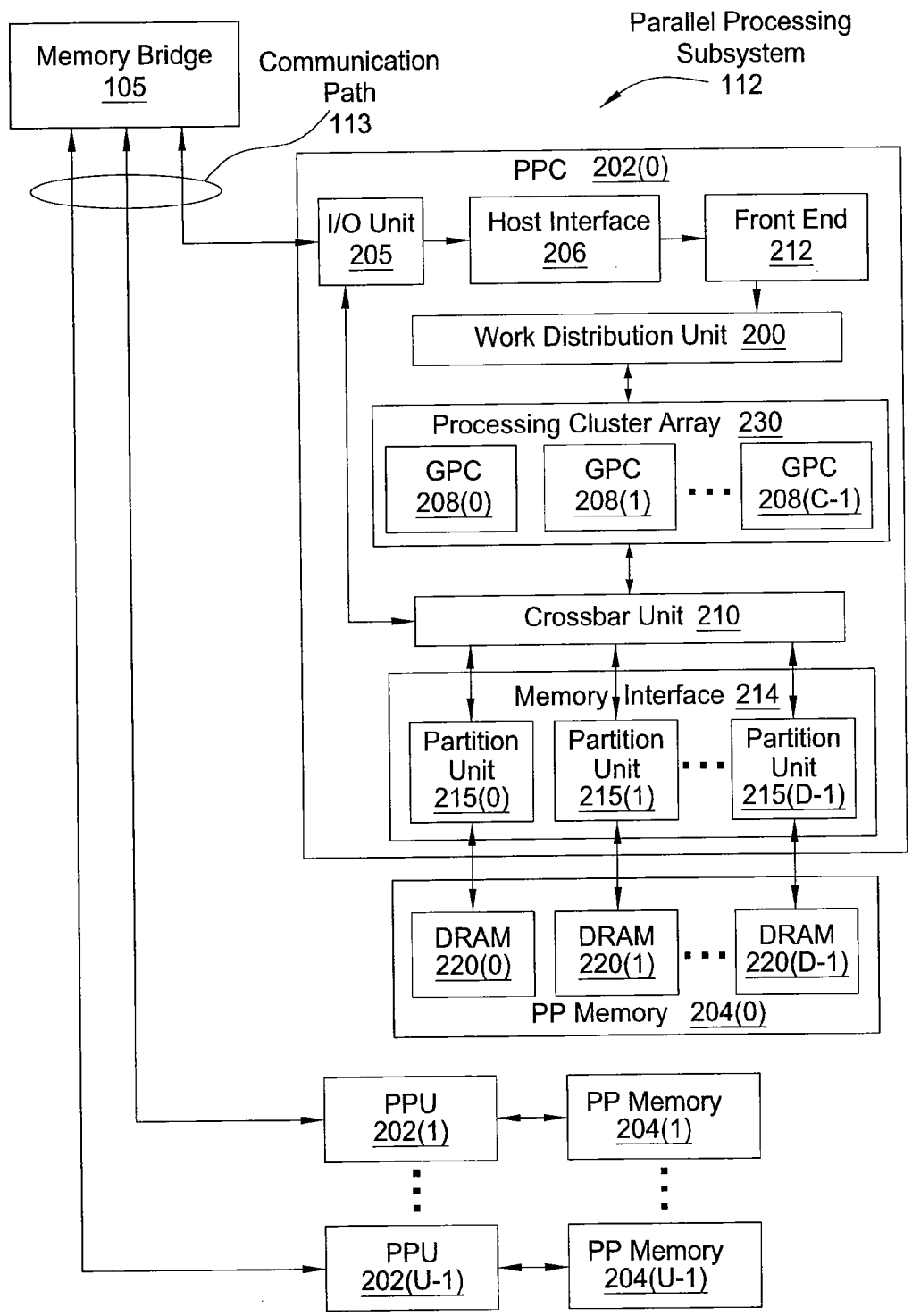
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCIe link, in which dedicated lanes are allocated to each PPU 202, as is known in the art. Other communication paths may also be used. As mentioned above, the contraflow interconnect may also be used to implement the communication path 113, as well as any other communication path within the computer system 100, CPU 102, or PPU 202. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C 1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that dynamic random access memories (DRAMs) 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCIe) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Equalization Coefficient Search Algorithm

Figure 3:
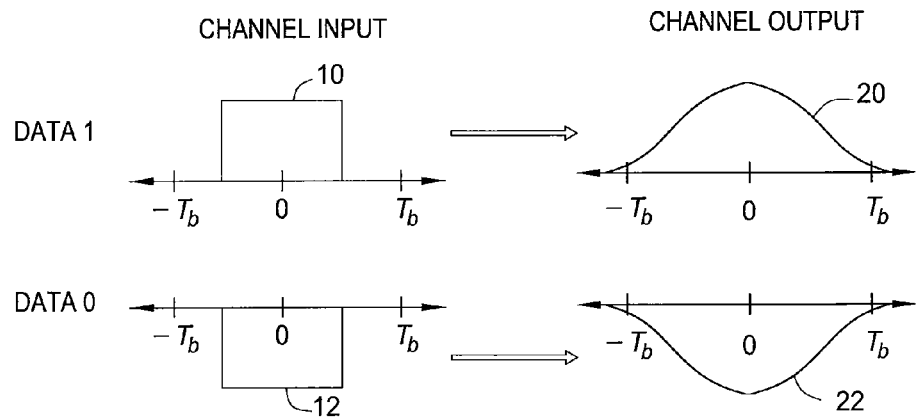
FIG. 3 is a conventional illustration of transmitted signals and received signals.

FIG. 3 is a conventional illustration of transmitted signals and received signals. In a computer system, signals can be transmitted in the forms of 1s and 0s along wires to their destination. The signals can degrade as they travel over a channel, so at the destination it may be hard to determine whether the received bit is a 1 or a 0. Input signal 10 represents a data 1 at the transmission end of a channel. Input signal 10 comprises a pulse width of approximately $T_b$. Input signal 12 represents a data 0 at the transmission end of the channel. Input signal 12 also comprises a pulse width of approximately $T_b$. Input signals 10 and 12 appear sharp, like step functions.

The right side of FIG. 3 illustrates two output signals at the receive end of the channel. Output signal 20 comprises a received data 1, and output signal 22 comprises a received data 0. These output signals are distorted due to Intersymbol Interference (ISI) and thus the output signals do not exactly match the sharp look of input signals 10 and 12. If the distortion becomes too great at the receive end, a 1 could be mistaken for a 0 (or vice versa) and an error would be introduced in the transmission.

Figure 4:
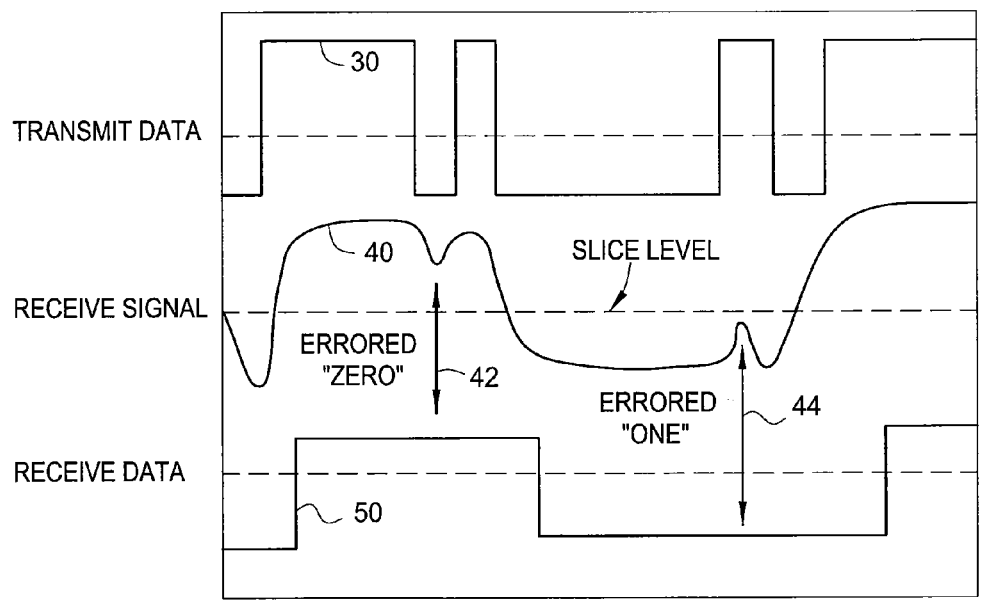
FIG. 4 is a conventional illustration of transmitted data and received data that results in errors.

FIG. 4 is a conventional illustration of transmitted data and received data that results in errors. Transmit data at a channel input is represented by waveform 30. Waveform 30 comprises a series of 1s and 0s transmitted on a channel. Waveform 30 appears sharp, with clear transitions between 1s and 0s. The dotted line represents a slice level, which marks the boundary between a data 1 and a data 0. Waveform 40 is a representation of the signal at the receive end. Because of interference in the channel, the received signal can be distorted and does not appear as sharp as the transmitted data represented by waveform 30. Waveform 50 is a representation of the data in waveform 40. In other words, when waveform 40 is converted to 1s and 0s the result is waveform 50. As shown in FIG. 4, waveform 50 (the received data) does not exactly match waveform 30 (the transmitted data). Errors were introduced in the transmission. An errored zero 42 is shown, which means a 0 was transmitted but the receiver received a 1. An errored one 44 is also shown, where a 1 was transmitted but the receiver received a 0. When data switches quickly between 1s and 0s, as shown in waveform 30, some of the transitions may be lost due to interference in the received signal (waveform 40), resulting in errors (such as errors 42 and 44) in the received data (waveform 50). As data connections and data transmissions become faster, these types of errors become more common because the received signals do not have enough time to fully transition from a 1 to a 0 or vice versa. Equalization can be performed to help prevent these errors.

In PCI Express Gen 3, equalization comprises implementing settings that compensate for ISI to make the received signal look like the original transmitted signal. Both transmission and receive equalization may be performed. In transmission equalization, the signal at the transmit end is "reshaped" before the signal is sent, in a manner that is complementary to the distortion that will be introduced by the channel. In other words, the reshaping can counteract the distortion. Reshaping can allow the receive end to more easily differentiate between 1s and 0s. In receive equalization, the signal is reconditioned at the receive end to counter the distortion introduced by the channel and further improve the signal quality. In PCI Express Gen 3, both transmission and receive equalization can be performed.

Figure 5:
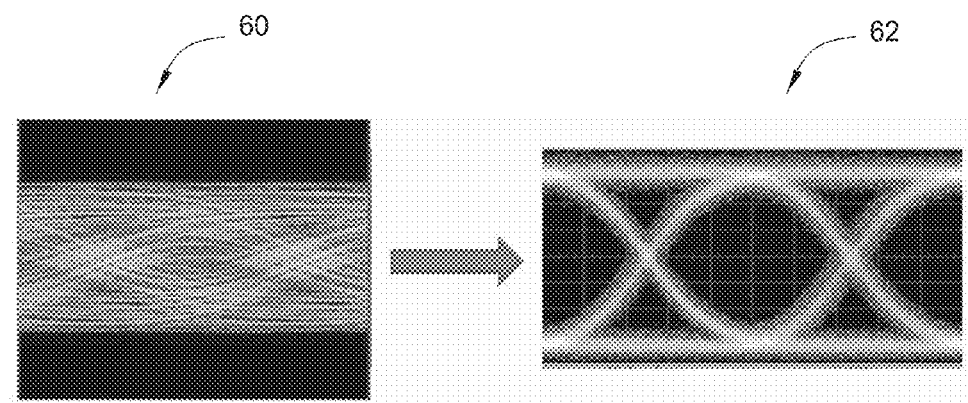
FIG. 5 is an illustration of signals at the receive end before and after equalization according to one embodiment of the present invention.

FIG. 5 illustrates one example of signals at the receive end of a transmission before and after equalization according to one embodiment of the present invention. The signals shown in waveform 60 have not had equalization performed on them. The signals shown in waveform 62 illustrate signals after equalization. The transitions between 1s and 0s can more be seen more clearly in waveform 62 than in waveform 60 due to equalization.

Figure 6:
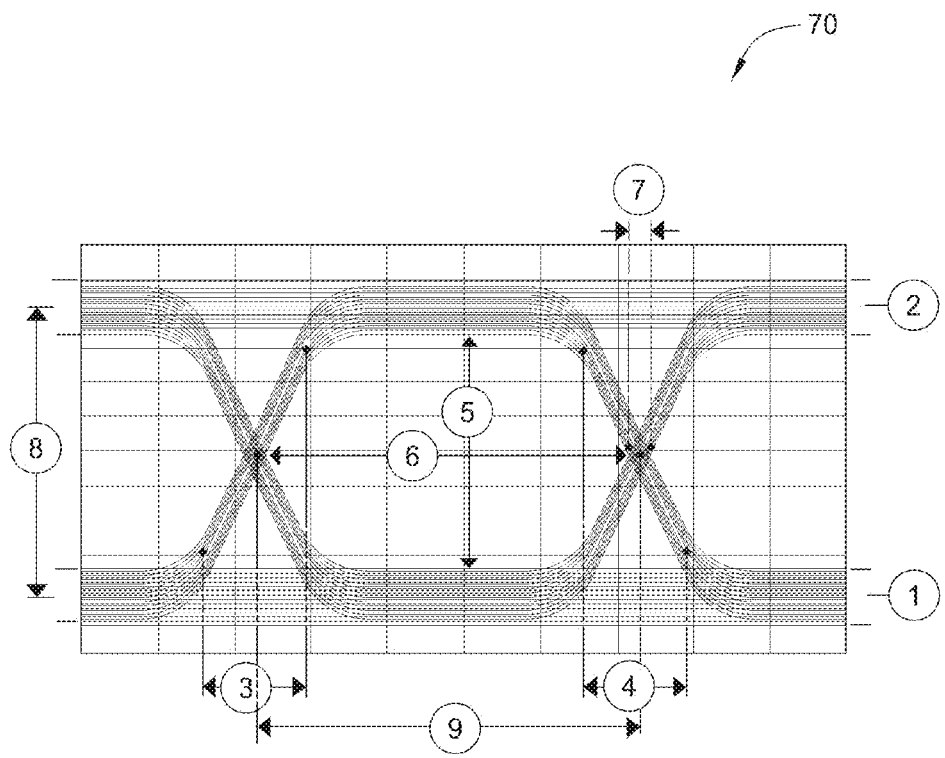
FIG. 6 is a conventional illustration of an eye diagram from an oscilloscope.

FIG. 6 is a conventional illustration of an eye diagram 70 from an oscilloscope probed at the receive end of a transmission channel. Measurement #5 is the eye height. The eye height provides a measure of the noise or interference in the channel. As the interference increases, the "eye" appears to close and the eye height measurement becomes smaller. As the interference decreases, the eye height measurement becomes larger. Thus the eye height can be measured to check the quality of the transmissions on a channel. During an equalization training process, multiple sets of parameters can each be tested using an eye diagram to find an optimal set of parameters. As is well understood, other measurements shown in the eye diagram 70 (measurements 1-4 and 6-9) can be used to derive other performance measures of the channel.

Below is a discussion of a number of example equalization algorithms. These algorithms may be used to perform equalization within given time limits. Modifications and changes may be made to these algorithms without departing from the broader spirit and scope of the invention.

Equalization in PCIe can be accomplished by finding optimal transmission equalization coefficients that can be used to tune the transmitter. Three coefficients (known as the precursor, the postcursor, and the maincursor) can be specified, and the coefficients are constrained by the following equations:

$$\text{precursor} + \text{maincursor} + \text{postcursor} = FS \quad (1)$$

$$FS - 2*(\text{precursor} + \text{postcursor}) >= LF \quad (2)$$

$$\text{Precursor} <= FS/4 \quad (3)$$

where LF=low frequency and FS=full swing, both of which are constant for a particular port. Coefficients that satisfy these equations are called "legal" and those that do not are called "illegal." The term "optimal coefficients"

means coefficients that result in a bit error rate (BER) of $10^{-12}$ or less. A typical computer system may have hundreds of legal combinations of equalization coefficients. The algorithms and techniques described in this disclosure may be used to efficiently find a set of optimal coefficients among the legal combinations of coefficients.

FIG. 7 is an illustration of a map of equalization coefficients according to one embodiment of the present invention. A map such as this example may be used to visualize coefficients. Each point on the map represents a combination of a precursor and a postcursor. Because the maincursor can be derived from the other two coefficients using equation (1) above, the search algorithm only tracks the precursor and the postcursor. FIG. 7 illustrates the postcursor ($C_{+1}$) on the x-axis and the precursor ($C_{-1}$) on the y-axis. In this example, the FS value is 24 and the coefficients are expressed as ratios of FS. The shaded squares on the map represent presets and the dotted lines represent the boundaries separating legal coefficients from illegal coefficients.

Each point on the map has an eye height associated with it, which represents the link quality produced by the coefficients at that point. The evaluation of this link quality may be performed by a state machine such as a decision feedback equalizer, or DFE. Any suitable equalizer may be used, and may be referred to as EQ Train in certain example embodiments in this disclosure. The end result is a score, referred to as "qeye" in certain example embodiments in this disclosure. The qeye is a measure of the eye height, and higher values represent better link qualities. The goal of the search algorithms is to find the highest value on the map, or alternatively to find a value that meets or exceeds a predetermined threshold. Quality metrics other than the eye height may be used, such as a measure of the eye width or a measure of the eye area.

As noted above, there often is not enough time to test every point on the map. In one example implementation using PCIe, each point may take more than 200 microseconds to evaluate. Evaluating 250 points would therefore require approximately 50 milliseconds, but the PCIe specification, for example, only allows a maximum of 24 milliseconds to find the optimal coefficients. In addition, it is desirable to finish as quickly as possible so that other operations can be performed. The search algorithms described here will work for short channels (where a lot of points on the map are acceptable) and long channels (where only a few points on the map are acceptable). The search algorithms described here can also take advantage of monotonically increasing qeye values in local areas of the map to conduct a more efficient search.

In one embodiment of this invention, a coarse grain search is conducted over a large coefficient map to find a region of the map that is likely to have the highest qeye. Once that analysis is complete, a fine grain search can be performed on a smaller portion of the map to find the highest qeye. Performing the coarse grain search provides an overview of the map in a short amount of time, and then the more accurate fine grain search can be used to hone in on a set of optimal coefficients.

Figure 8A:
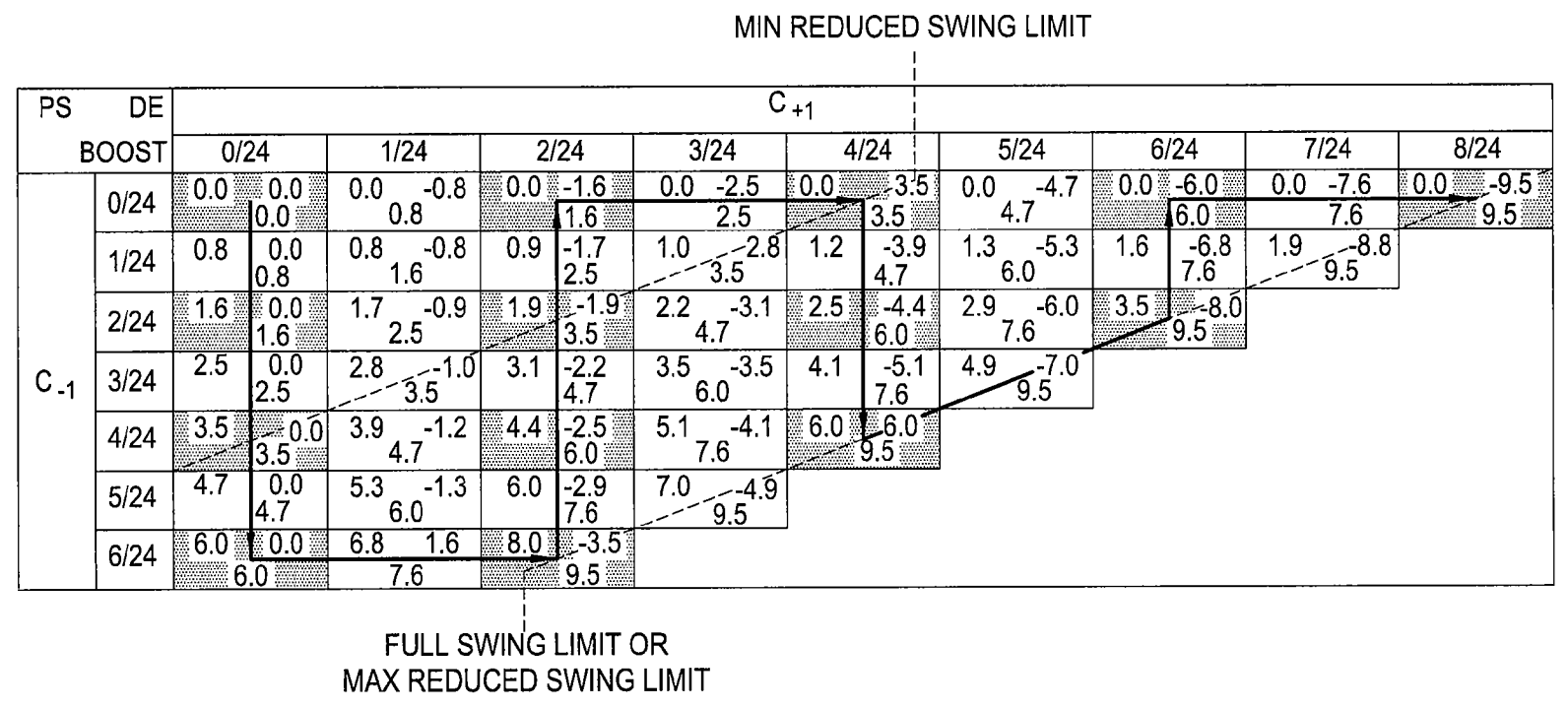
Figure 8B:
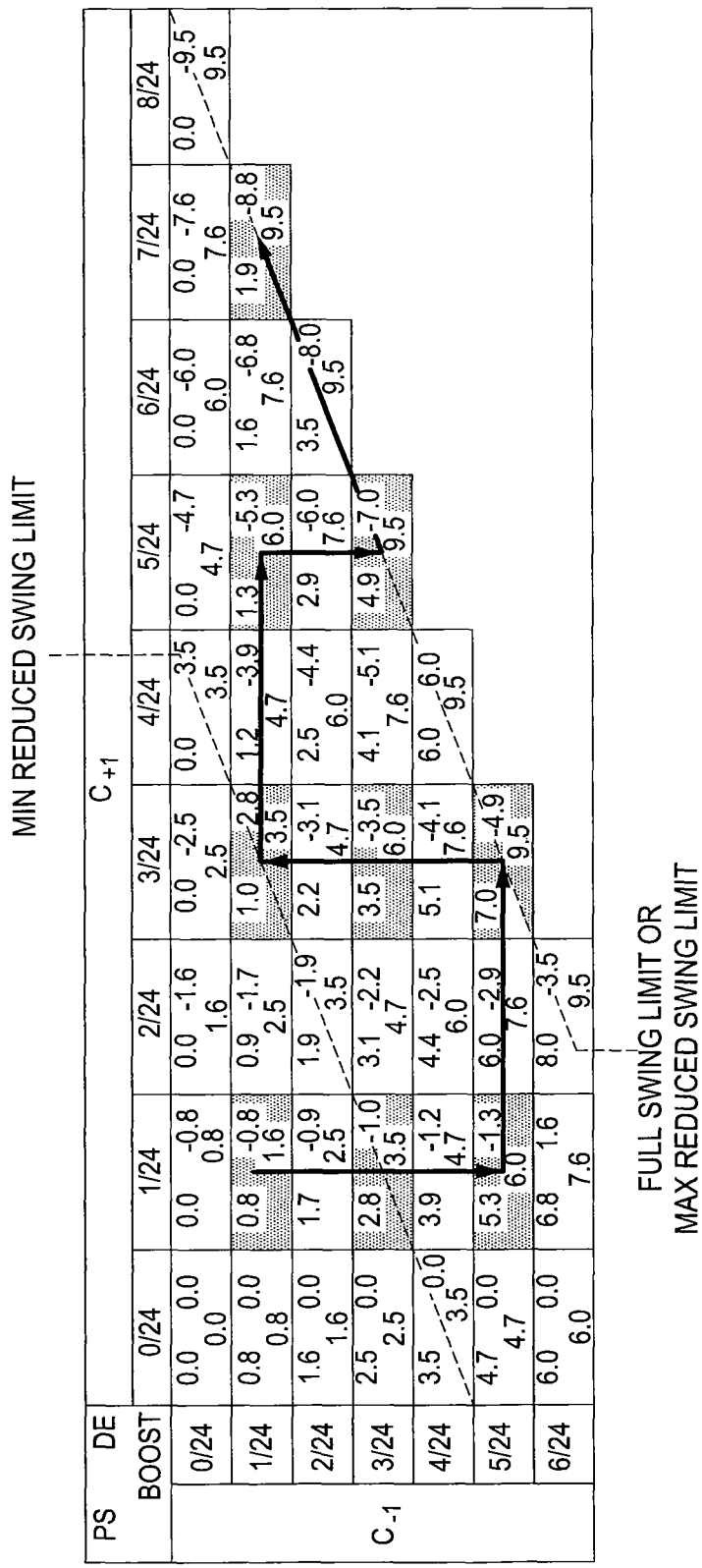

The coarse grain search can be conducted in a variety of ways. FIGS. 8A and 8B illustrate one example embodiment of a coarse grain search. As shown, the coarse grain search comprises four sequences—each of which iteratively "walks" the map using a step size of 2. The first sequence, illustrated in FIG. 8A, starts at coordinates (0,0) on the map, while the second, third, and fourth sequences start at (1,1), (0,1), and (1,0), respectively. The first sequence covers the shaded points on the map in the following order: (0,0), (0,2), (0, 4), (0,6), (2,6), (2,4), (2,2), (2,0), (4,0), (4,2), (4,4), (6,2), (6,0), (8,0). FIG. 8B illustrates the second sequence, which begins at (1,1) and walks the map with a step size of 2 as shown. Sequences three and four (not shown) are also run. By breaking down the coarse grain search into four sequences, the algorithm is able to cover a wide area of the map during the early phase of the search, and then cover the entire map if time permits. If the coarse grain search runs out of time before all four sequences are completed, the best point found up to that point in time is stored and passed on to the fine grain search.

Exit conditions may be put into place for the coarse grain search. In one example embodiment, the coarse grain search algorithm can exit if any of the following events occur:
(1) a point has been found that exceeds the minimum acceptable qeye threshold;
(2) the number of iterations has exceeded a predetermined value;
(3) the total time in the coarse grain search has exceeded a predetermined value; or
(4) all the points specified in all the selected coarse grain sequences have been tested.

Once the exit condition occurs, the best point on the map is used as the starting point for the fine grain search.

Figure 9:
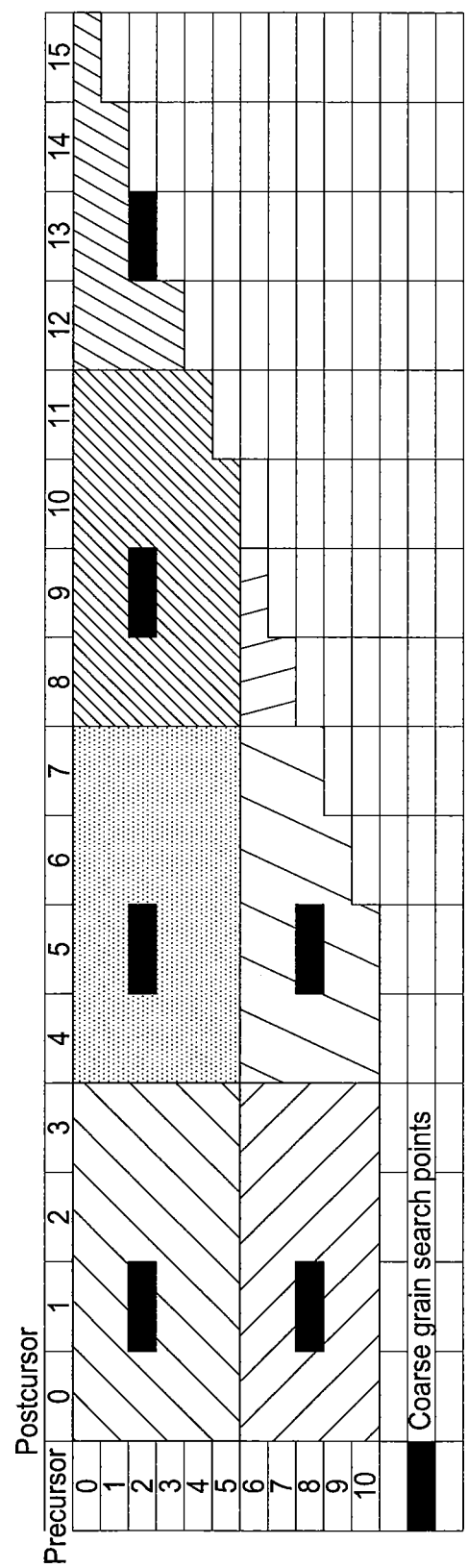
FIG. 9 is an illustration of another technique for performing a coarse grain search on a map of equalization coefficients according to one embodiment of the present invention.

FIG. 9 is an illustration of another technique for performing a coarse grain search on a map of equalization coefficients according to one embodiment of the present invention. In this example embodiment, the coarse grain search splits each axis into 2, 4, or 8 parts to divide the coefficient map into approximately equal regions. Then the center point of each region is selected and the coefficients associated with those center points are checked for legality. The qeye for each legal point is determined, and the point with the highest qeye is selected as the "best coarse point" and used as the starting point for the fine grain search.

In some embodiments, techniques other than a coarse grain search may be used to select a starting point for the fine grain search. The use of these techniques may be faster than performing a coarse grain search. For example, a software program or process may be used to specify one set of coefficients to evaluate. The specified set of coefficients may be a set of coefficients that was previously used for equalization in the system. In some closed systems, such as laptop computers, the optimal equalization coefficients may not change during each boot cycle, so these coefficients can be used as a starting point for the fine grain search or can even be re-used without a fine grain search if the eye height associated with the coefficients meets an acceptable threshold.

FIG. 10 is an illustration of a technique for performing a fine grain search on a map of equalization coefficients according to one embodiment of the present invention. The coarse grain search algorithms described above are used to find a "best coarse point" to be used as the starting point for the fine grain search. One example algorithm for a fine grain search will now be described. Each set of coefficients evaluated is called a "tuning attempt" or "iteration" of the algorithm. The fine grain search algorithm begins by evaluating the neighboring coefficients around the starting point. Then, the algorithm "walks" one point at a time in the direction of the neighboring point with the highest eye height. The adjacent, or neighboring, point associated with the greatest eye height can be referred to as a currently traversed point. Walking in that direction (a first direction) and evaluating each point along the way continues until the eye height begins to fall, or until a boundary is reached. At the point on the map where the eye height begins to fall (or a boundary is reached), the algorithm evaluates the eight surrounding points on the map (or fewer, in the case of a boundary). The algorithm then again walks in the direction of the point with the highest eye height (a second direction), and repeats these walking and exploring steps until an exit condition is met. Four potential exit conditions are:

(1) all eight surrounding points are lower—the algorithm has reached a local maximum;
(2) time runs out;
(3) the number of iterations has reached a predetermined threshold; or
(4) the eye height reaches an acceptable threshold.

Again, FIG. 10 provides a detailed example of a fine grain search. Assume that the coarse grain search selected point (3,5) as the starting point. The numbers on the map in FIG. 10 are exemplary only, and are used to represent the eye height for the equalization coefficients associated with each point on the map. The number at starting point (3,5) is 5. The algorithm evaluates the neighboring coefficients around this starting point, and finds that point (4,5) has the highest eye height of all the neighboring points—an eye height of 6. Evaluating the neighboring points in this manner can be referred to as the "Explore Mode." The algorithm then walks in the direction of point (4,5), one step at a time, until the eye height begins to fall. This direction can be considered a first direction, and point (4,5) can be referred to as the currently traversed point. Walking along the map can be referred to as the "Walk Mode." At point (8,5) the eye height is 10, and at point (9,5) the eye height is 9. The algorithm will therefore re-center around the point where the eye height beings to fall, point (8,5). The algorithm then evaluates the eight points surrounding point (8,5) on the map and finds that point (8,6), with an eye height of 12, is the point with the highest eye height. So the algorithm walks from point (8,5) in the direction of point (8,6) (i.e., a second direction), and continues until the eye height begins to fall. The eye height is 19 at point (8,10) and falls at point (8,11) to 14. Once again, the algorithm re-centers, this time around the point (8,10) and evaluates the eight points surrounding point (8,10). After this evaluation, the algorithm finds that the eye height of all eight surrounding points is lower than the eye height at point (8,10). Therefore, the algorithm has met an exit condition and the equalization coefficients at point (8,10) are selected for use in the system. The fine grain search in this example is concluded.

During a fine grain search, each set of coefficients on the map that are encountered by the algorithm can first be checked for legality. If an illegal point is encountered while in Explore Mode, the algorithm can skip that point and move on. If an illegal point is encountered while in Walk Mode, the algorithm can stop walking at that point and switch to Explore Mode.

The coarse grain searches and fine grain searches described above can be implemented in a variety of ways and in a variety of systems. These techniques can be used, for example, with high speed serial communications protocols like PCIe to prepare data signals for transmission. The PCIe 3.0 Base Specification does not address equalization search algorithms.

In one example implementation involving PCIe 3.0, Recovery.Equalization is a substate of the Recovery state of the Link Training and Status State Machine (LTSSM). This substate is used to find the optimal transmit coefficients for proper operation at 8.0 GT/s speed. The equalization coefficients can be determined automatically by hardware using a handshake protocol. Therefore a Recovery.Equalization training algorithm is used to find the optimal coefficients in the shortest possible time.

The Recovery.Equalization substate is further divided into five sub-substates:

(1) Recovery.Equalization Phase 0
(2) Recovery.Equalization Phase 1
(3) Recovery.Equalization Phase 2 Req Coeff
(4) Recovery.Equalization Phase 2 EQ Train
(5) Recovery.Equalization Phase 3

Recovery. Equalization Phase 0 is reserved for upstream ports only (i.e. endpoint). When the downstream port (i.e. rootport) requests entry into Recovery. Equalization, the endpoint enters this state first. Prior to entering this state, the endpoint applies the rootport suggested equalization coefficients to its transmitter (the rootport suggested preset is communicated by the rootport at gen1/gen2 speed just before the first speed change to gen3). The reason for a rootport suggested preset is that since most of the trace is on the motherboard, the rootport manufacturer would be in a better position to predict what the optimal preset would be, so the manufacturer should specify the preset to start with. This manufacturer specification may allow the search algorithm to settle at the optimal point sooner.

Recovery.Equalization Phase 1 is for both upstream and downstream ports. Both ports apply the rootport suggested presets to their transmitters. The ports also communicate their FS and LF values to each other via training sets (TS1s), so that each port can plug these values into the constraint equations specified above. This step enables each port to search only legal coefficients in its respective "master" phase (i.e., phase 2 for upstream ports, phase 3 for downstream ports).

In Recovery.Equalization Phase 2 Req Coeff, the upstream port (endpoint) sends requests to the downstream port (rootport) to set its Tx (transmit) settings to the values that the upstream port thinks would be optimal, and waits for the request to be accepted or rejected. The upstream port can take care to request only legal coefficients, but may also have a mechanism to handle the case where legal coefficients are rejected by the other side. The upstream port may request equalization settings to be applied by specifying the individual coefficients (precursor, maincursor, postcursor).

In Recovery.Equalization Phase 2 EQ Train, the upstream port evaluates the link quality produced by the coefficients requested in Recovery.Equalization Phase 2 Req Coeff. This evaluation can be performed by an equalizer, and the end result is the qeye. The port then makes a note of this value, and compares it with the qeye values seen in earlier requests—if this is the highest one so far, the port stores the requested coefficients in a temporary variable, such as (best_precursor, best_maincursor, best_postcursor).

The next state is Recovery.Equalization Phase 2 Req Coeff if more coefficients need to be tried (to search for an even higher qeye), or Recovery.Equalization Phase 3, if the max qeye is greater than the acceptable threshold (or if the algorithm cannot find any other points worth trying). The maximum time that can be spent iterating between Recovery.Equalization Phase2 Req Coeff and Recovery.Equalization Phase 2 EQ Train is 24 ms in this embodiment. After 24 ms is up, the port transitions to Recovery.Equalization Phase 3.

In Recovery.Equalization Phase 3, the downstream port makes requests to the upstream port to change the upstream port's Tx settings, and the downstream port tries to find the best qeye for the link in the upstream port-to-downstream port direction. This phase has a timeout of 32 ms. The upstream port simply has to receive the requests, reflect them back and indicate "accepted" when they are legal (or "reject" when they are illegal), and apply the legal ones to its own transmitter settings.

The Recovery.Equalization Training Algorithm is only applicable to the sub-substates Recovery.Equalization Phase 2 Req Coeff and Recovery.Equalization Phase 2 EQ Train, since only those states are allocated to the endpoint for performing the coefficient search. Each set of coefficients tried is called a 'tuning attempt' or 'iteration' of the algorithm. The transition from Recovery.Equalization Phase 2 Request Coeff can happen when certain conditions are met. The transition from Recovery.Equalization Phase 2 EQ Train to Recovery.Equalization Phase 2 Req Coeff can occur when an EQ Train signal goes high.

One example embodiment of a search algorithm encompassing both coarse and fine approaches, as well as other approaches, is described below. This example embodiment can be broadly classified into five sub-algorithms:
(1) Request Previous Best Settings—if the "best coefficient" variables have valid values, then request these values again. This sub-algorithm is useful if the link enters the Recovery.Equalization state again and the user wants to test the point found by the previous equalization search.
(2) SBIOS Preset Request—request the preset that was recommended by the rootport prior to entering gen3.
(3) Software Specified Coefficient Request—software supplies a set of coefficients that may be optimal via registers
(4) Coarse Grain Algorithm—search the coefficient space at a certain stride (or step_size) to find a region of high qeye values; or perform any other type of coarse grain algorithm, as described above
(5) Fine Grain Algorithm—search near the highest point uncovered in the previous steps, but restrict the step_size to 1. Always advance in the direction that has the highest gradient of increase in qeye, as described above.
(6) A last step is to re-request the best point found in the previous 5 steps. This step is a one-iteration pass through step.

Figure 11:
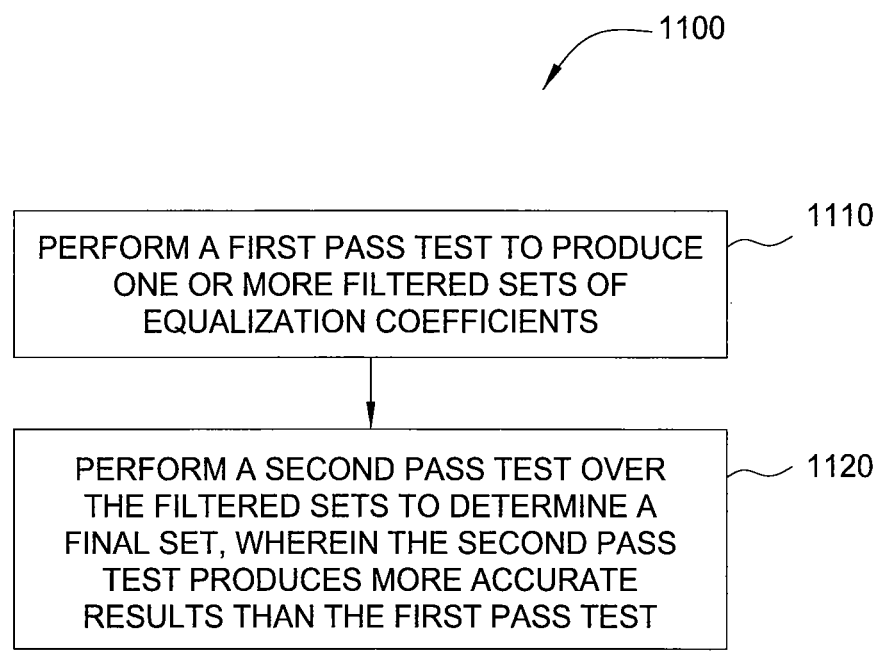
FIG. 11 is a flowchart illustrating an example multipass approach for channel equalization training according to one embodiment of the present invention.

FIG. 11 is a flow diagram of method steps for performing multipass channel equalization training according to one embodiment of the present invention. Although the method steps are described in conjunction with FIGS. 1, 2, and 7-10, persons skilled in the art will understand that any system configured to perform the method steps, in any order, falls within the scope of the present invention. Processing unit 102 is configured to perform the various steps of the method 1100 when executing a software application stored in a memory, such as system memory 104. In some embodiments, parallel processing subsystem 112 may perform some of the steps of the method 1100.

As shown, a method 1100 begins in step 1110, where processing unit 102 performs a first pass test over a set of equalization coefficients. The first pass test produces one or more filtered sets of equalization coefficients that each meets a certain criteria. The first pass test may comprise one of the coarse grain search algorithms as described above. The first pass test may, for example, determine an eye height associated with each set of equalization coefficients and filter the sets of equalization coefficients based at least in part on that eye height.

In step 1120, processing unit 102 performs a second pass test over the one or more filtered sets of equalization coefficients to determine a final set of equalization coefficients. The second pass test produces more accurate results than the first pass test. The second pass test may take a longer amount of time to perform than the first pas test. In addition, the second pass test may comprise the fine grain search algorithm as described above. The second pass test may, for example, determine an eye height associated with each set of equalization coefficients and select or reject the set of equalization coefficients based at least in part on that eye height.

Figure 12:
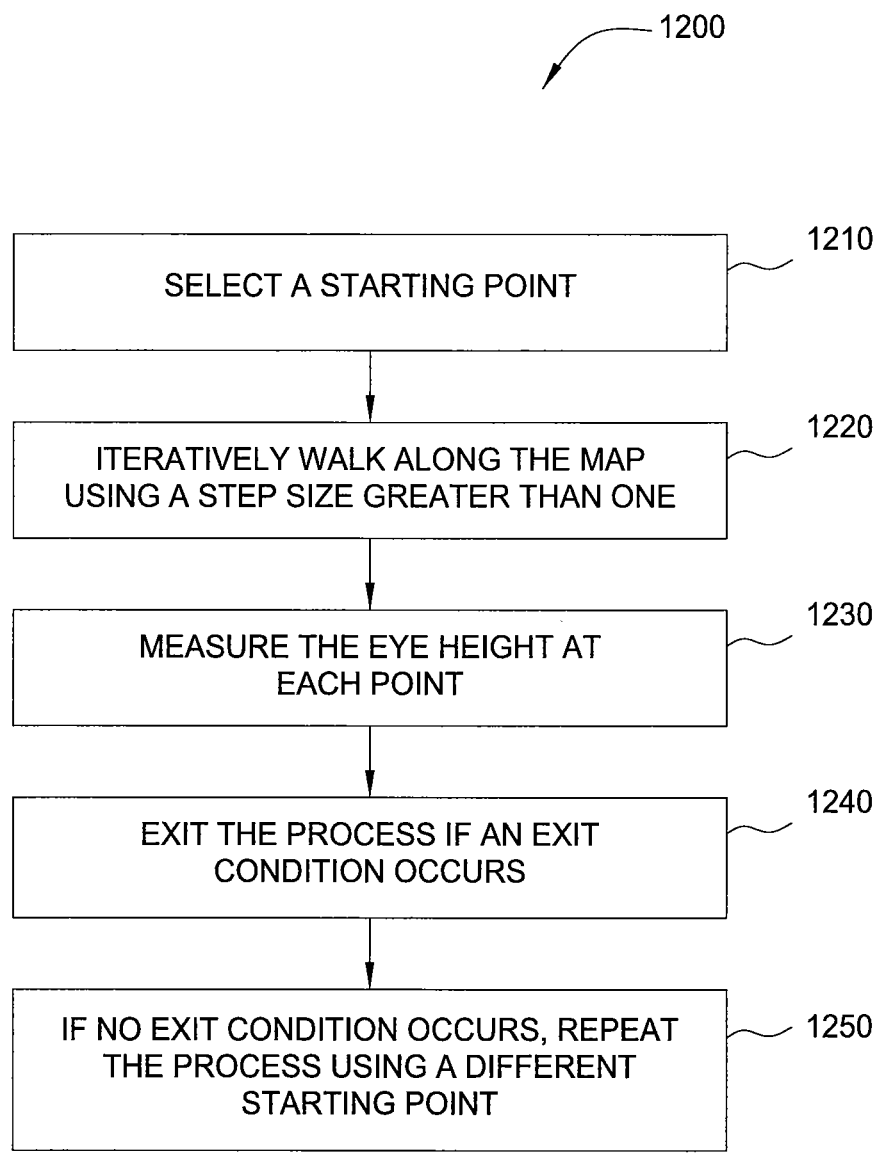
FIG. 12 is a flowchart illustrating an example technique for performing a coarse grain search according to one embodiment of the present invention.

FIG. 12 is a flow diagram of method steps for performing a coarse grain search according to one embodiment of the present invention. Although the method steps are described in conjunction with FIGS. 1, 2, and 7-10, persons skilled in the art will understand that any system configured to perform the method steps, in any order, falls within the scope of the present invention. Processing unit 102 is configured to perform the various steps of the method 1200 when executing a software application stored in a memory, such as system memory 104. In some embodiments, parallel processing subsystem 112 may perform some of the steps of the method 1200.

The process begins with step 1210. Processor 102 executes the software application to select a starting point on a map of equalization coefficients. In an exemplary embodiment illustrated in FIG. 8A, the starting point that is selected is (0,0). Other points may be selected in other embodiments.

In step 1220, processor 102 executes the software application to walk iteratively along the map using a step size greater than one. In the exemplary embodiment illustrated in FIG. 8A, the step size is 2. Other step sizes may be used in other embodiments. In the exemplary embodiment, the technique walks from point (0,0) to point (0,2), then to points (0,4), (0,6), (2,6), etc., as described above with respect to FIG. 8A. This method can cover a wide area of the map in a short amount of time by using a step size greater than one.

In step 1230, processor 102 executes the software application to measure the eye height of each point. The point with the highest eye height is stored in memory, and other points may be stored as well. Any suitable process for measuring eye height may be used. The point with the highest eye height may be used as the optimal coefficients or may be used as a starting point for another search algorithm, such as a fine grain search.

In step 1240, processor 102 executes the software application to exit the method if an exit condition occurs. A number of potential exit conditions may be used. A first exit condition occurs if a point has been found that exceeds the minimum acceptable qeye threshold. If this exit condition occurs, the search has found a set of optimal coefficients and these coefficients may be selected and utilized for transmissions. A second exit condition occurs if the number of iterations has exceeded a predetermined value. The search may be performed with a predetermined maximum number of iterations so as to not exceed a time limit for the coarse grain search. If the number of iterations is reached, the search process can exit. Another exit condition may occur if the total time in the coarse grain search has exceeded a predetermined value. A fourth exit condition may occur if all the points specified in all the selected coarse grain sequences have been tested. When an exit condition occurs, processor 102 may execute the software application to select the best equalization coefficients found (as measured by eye height) and either use those coefficient for equalization or use those coefficients as the starting point for a fine grain search.

In step 1250, if no exit condition has occurred, processor 102 executes the software application to repeat the method by starting at step 1210 and using a different starting point. As an exemplary embodiment, the process may use starting point (0,0) for the first sequence and then use starting point (0,1) for a second sequence. The second sequence proceeds exactly as the first by walking along the map using a step size greater than one, measuring eye heights, and exiting if an exit condition occurs. Any number of additional sequences can occur if the exit conditions have not been met.

Figure 13:
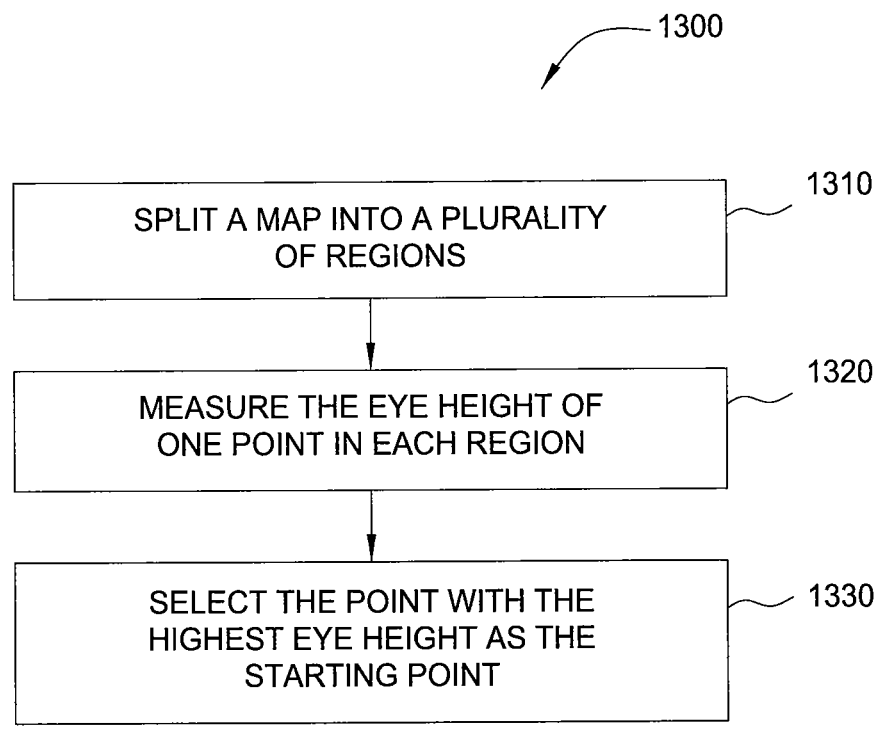
FIG. 13 is a flowchart illustrating another example technique for performing a coarse grain search according to one embodiment of the present invention.

FIG. 13 is a flow diagram of method steps for performing a coarse grain search according to one embodiment of the present invention. Although the method steps are described in conjunction with FIGS. 1, 2, and 7-10, persons skilled in the art will understand that any system configured to perform the method steps, in any order, falls within the scope of the present invention. Processing unit 102 is configured to perform the various steps of the method 1300 when executing a software application stored in a memory, such as system memory 104. In some embodiments, parallel processing subsystem 112 may perform some of the steps of the method 1300.

The process begins with step 1310. In this step, processor 102 executes the software application to split a map of equalization coefficients into a plurality of regions. An example of splitting a map in this manner can be seen in FIG. 9. The map can be split into regions of approximately equal size or into regions of unequal size. The map can be split into any appropriate number of regions.

In step 1320, processor 102 executes the software application to measure the eye height of one point in each region. The point that is measured in each region can be selected in a variety of ways. In some embodiments, the center point of the region could be selected. In other embodiments, a random or pseudorandom point could be selected. The eye heights are measured using any suitable technique.

In step 1330, processor 102 executes the software application to select the point with the highest eye height as the starting point for a fine grain search algorithm or another search algorithm. Ideally, selecting the point with the highest eye height as the starting point leads to finding an optimal set of equalization coefficients more quickly than starting with another point.

Figure 14:
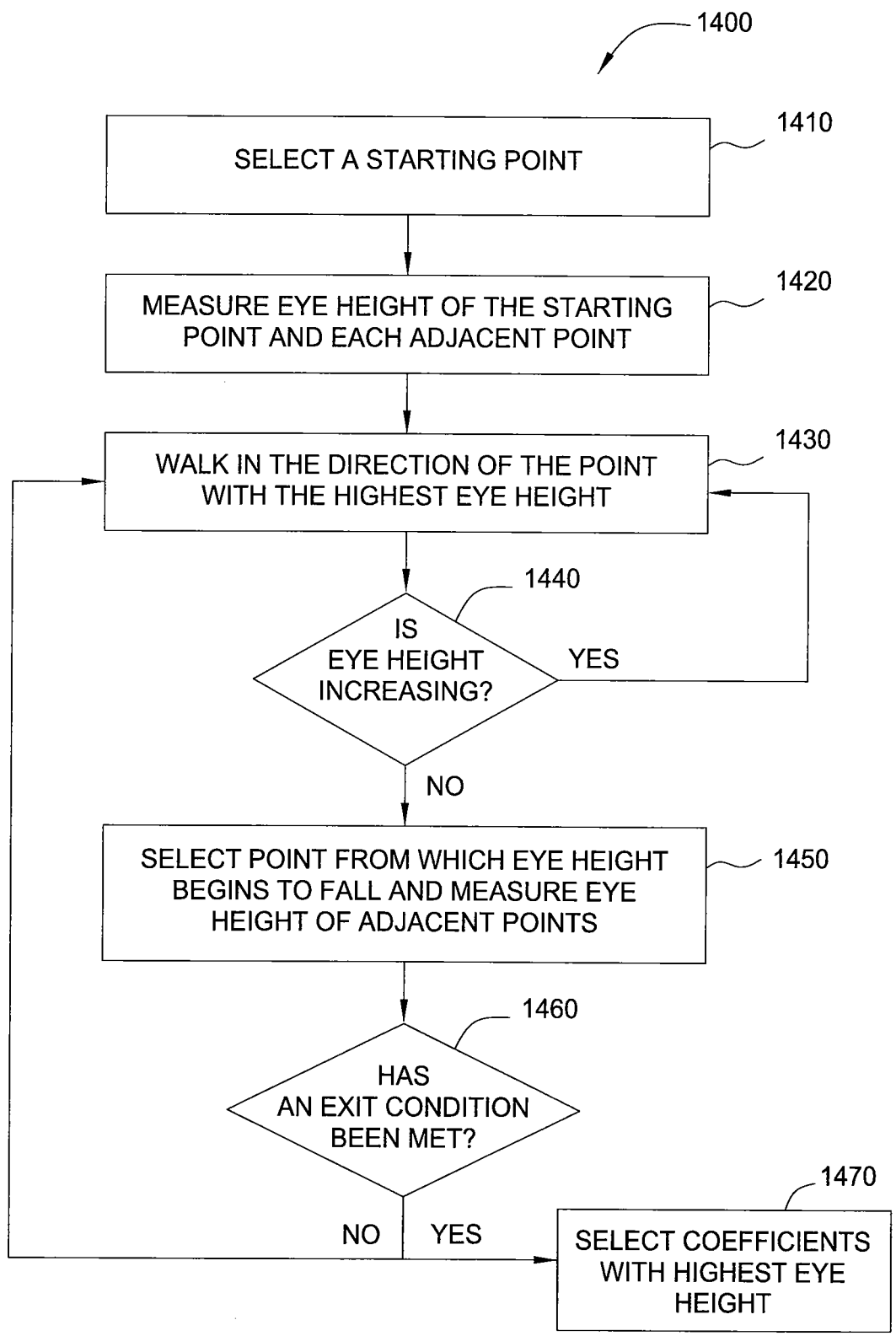
FIG. 14 is a flowchart illustrating an example technique for performing a fine grain search according to one embodiment of the present invention.

FIG. 14 is a flow diagram of method steps for performing a fine grain search according to one embodiment of the present invention. Although the method steps are described in conjunction with FIGS. 1, 2, and 7-10, persons skilled in the art will understand that any system configured to perform the method steps, in any order, falls within the scope of the present invention. Processing unit 102 is configured to perform the various steps of the method 1400 when executing a software application stored in a memory, such as system memory 104. In some embodiments, parallel processing subsystem 112 may perform some of the steps of the method 1400.

The technique begins with step 1410. In step 1410, processing unit 102 selects a starting point on a map of equalization coefficients. The map of equalization coefficients may be similar to the map shown in FIG. 7 in one example embodiment. The starting point can be selected by any suitable technique, including one of the coarse grain search algorithms or one of the sub-algorithms described above.

In step 1420, processing unit 102 executes the software application to measure the eye heights of the starting point and each point adjacent to the starting point. These eye heights can then be used to search for an optimal set of equalization coefficients on the map. Any suitable approach can be used to measure the eye heights.

In step 1430, processor 102 executes the software application to walk along the map of equalization coefficients in the direction of the point adjacent to the starting point with the highest eye height. This process was discussed above with respect to FIG. 10.

In step 1440, processor 102 executes the software application to determine if the eye height is still increasing or not. If the eye height is still increasing, the method returns to step 1430 and continues to walk in the direction the point with the highest eye height. Steps 1430 and 1440 are repeated as long as the eye height is increasing (or until certain exit conditions are met, as discussed below). If the eye height is not still increasing, the method proceeds to step 1450.

In step 1450, processor 102 executes the software application to select the point from which the eye height begins to fall and measure the eye height of each adjacent point. This process was also discussed above with respect to FIG. 7. These eye heights are used to determine a new direction to walk in or to determine if an exit condition is met. The process then continues to step 1460.

In step 1460, processor 102 executes the software application to determine if an exit condition has been met. A number of potential exit conditions may be used, as described above with respect to FIG. 10. If each adjacent point has a lower eye height than the point where the eye height begins to fall, the method has found a local maximum and this may end the fine grain search algorithm in certain embodiments. Another exit condition may be if a predetermined time threshold has been met. A third exit condition may be if the eye height is above a predetermined threshold. If so, that eye height meets the requirements of the system and those coefficients can be selected by processor 102 for use. A fourth exit condition may be met when the number of iterations of the algorithm has reached a certain threshold. If an exit condition has not been met, the method returns to step 1430 to continue walking in the direction of the point with the highest eye height. If an exit condition has been met, the method continues to step 1470.

In step 1470, processor 102 executes the software application to select the coefficients with the highest eye height among all the sets of coefficients that have been analyzed. At least one of the exit conditions described above in step 1460 has been met, and the system can now continue with other boot-up processes. Ideally, the equalization coefficients that are selected will reduce the error rate in transmitted signals.

In sum, a two-pass approach may be used to find and select a set of optimal equalization coefficients for high-speed data transmissions. The first pass comprises a coarse grain search over a map that includes points comprising a set of equalization coefficients at each point. The goal of the coarse grain search is to choose a set of equalization coefficients that can be used for high-speed data transmissions or that can be used as the starting point for a second pass. The coarse grain search can be performed in a variety of ways, including dividing the coefficient map into a number of regions and testing one point in each region or walking iteratively around the map and testing a subset of the points on the map. The testing that is performed can include measuring an eye height associated with each set of equalization coefficients. The second pass comprises a fine grain search over the map. The fine grain search involves measuring the eye height of a starting point and the eye height of each point adjacent to the starting point. The search algorithm then walks along the map in the direction of the point with the highest eye height, and continues walking as long as the eye height keeps increasing. If the eye height beings to fall, the algorithm re-centers on the point with the highest eye height and evaluates all adjacent points. The algorithm then again walks in the direction of the point with highest eye height and continues the fine grain search until an exit condition is met. Once an exit condition is met, the algorithm selects the equalization coefficients with the highest eye height and uses those coefficients for equalization of transmissions along the high-speed data connection.

Advantageously, selecting equalization coefficients using the above techniques allows for faster selection of coefficients that meet the quality criteria required by the system. In some systems, such as servers, the channel is long and can be extremely noisy. The subset of acceptable coefficients is therefore very small. The search algorithms described above are effective in finding optimal coefficients by first identifying a region of the map of equalization coefficients where optimal coefficients may lie, and then by performing a thorough search of that region to find the best coefficients. In short channel systems (such as desktop computers), a large number of points may satisfy the operating requirements. The algorithms described herein can quickly do a coarse grain search and then locate an optimal point on the map using a fine grain search. The fine grain search can walk in any one of eight possible directions and this helps to find an optimal point quickly. In addition, some systems such as laptop computers have embedded links that are unchangeable, which means the equalization coefficients are not expected to change either. This disclosure provides for software that directly assigns known quality equalization coefficients as a starting point for a search. A search that begins on or near a quality point can often be completed very quickly.

Other advantages include the ability to fine tune the search algorithms discussed above by altering step sizes, exit conditions, or other variables. The algorithms discussed above can handle both legal and illegal points. The time allotted for the coarse grain search and/or the fine grain search can also be adjusted.

One embodiment of the invention may be implemented as a program product for use with a computer system. The program(s) of the program product define functions of the embodiments (including the techniques described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for analyzing equalization coefficients for a high-speed bus, the method comprising:
computing a metric to determine a starting point from a set of starting points on a map of equalization coefficients, wherein each point on the map comprises a different set of equalization coefficients, the map includes a plurality of regions, and each starting point included in the set of starting points resides in a different region of the map;
measuring an eye height associated with each adjacent point on the map relative to the starting point, wherein the eye height associated with each adjacent point is based on a signal transmitted using the set of equalization coefficients associated with the adjacent point;
walking, via a processor, on the map in a first direction from the starting point to the adjacent point associated with the greatest eye height; and
applying equalization coefficients associated with at least one of the starting point and the adjacent point associated with the greatest eye height to equalize transmissions on the high-speed bus.

2. The method of claim 1, further comprising:
designating the adjacent point associated with the greatest eye height as a currently traversed point; and
walking on the map in the first direction from the currently traversed point to an adjacent point on the map relative to the currently traversed point, wherein an eye height associated with the adjacent point is greater than or equal to the eye height associated with the currently traversed point.

3. The method of claim 2, wherein the steps of designating and walking on the map in the first direction are repeated until a currently traversed point on the map is reached where an eye height associated with an adjacent point on the map relative to the currently traversed point is less than the eye height associated with the currently traversed point.

4. The method of claim 3, further comprising:
measuring an eye height associated with each adjacent point on the map relative to the currently traversed point; and
walking on the map in a second direction from the currently traversed point to the adjacent point associated with the greatest eye height.

5. The method of claim 2, wherein the steps of designating and walking on the map in the first direction are repeated until an exit condition is met.

6. The method of claim 5, wherein the exit condition comprises:
exiting if a measured eye height is above a predetermined threshold;
exiting if a predetermined number of points has been visited;
exiting if a predetermined time limit has been exceeded; or
exiting if each point adjacent to the currently traversed point has a lower eye height than the eye height associated with the currently traversed point.

7. The method of claim 1, wherein computing the starting point comprises:
splitting the map into a plurality of regions;
measuring the eye height of one point in each region; and
selecting the point with the greatest eye height as the starting point.

8. The method of claim 1, wherein computing the starting point comprises:
iteratively walking along the map of equalization coefficients to at least one new point; and
testing the set of equalization coefficients represented by the at least one new point.

9. The method of claim 8, wherein the starting point is computed when an exit condition has been met.

10. A non-transitory computer-readable medium including instructions that, when executed by a processor, causes the processor to analyze equalization coefficients for a high-speed data bus, by performing the steps of:
    computing a metric to determine a starting point from a set of starting points on a map of equalization coefficients, wherein each point on the map comprises a different set of equalization coefficients, the map includes a plurality of regions, and each starting point included in the set of starting points resides in a different region of the map;
    measuring an eye height associated with each adjacent point on the map relative to the starting point;
    walking on the map in a first direction from the starting point to the adjacent point associated with the greatest eye height; and
    applying equalization coefficients associated with at least one of the starting point and the adjacent point associated with the greatest eye height to equalize transmissions on the high-speed bus.

11. The non-transitory computer-readable medium of claim 10, further comprising:
    designating the adjacent point associated with the greatest eye height as a currently traversed point; and
    walking on the map in the first direction from the currently traversed point to an adjacent point on the map relative to the currently traversed point, wherein an eye height associated with the adjacent point is greater than or equal to the eye height associated with the currently traversed point.

12. The non-transitory computer-readable medium of claim 11, wherein the steps of designating and walking on the map in the first direction are repeated until a currently traversed point on the map is reached where an eye height associated with an adjacent point on the map relative to the currently traversed point is less than the eye height associated with the currently traversed point.

13. The non-transitory computer-readable medium of claim 12, further comprising:
    measuring an eye height associated with each adjacent point on the map relative to the currently traversed point; and
    walking on the map in a second direction from the currently traversed point to the adjacent point associated with the greatest eye height.

14. The non-transitory computer-readable medium of claim 11, wherein the steps of designating and walking on the map in the first direction are repeated until an exit condition is met.

15. The non-transitory computer-readable medium of claim 14, wherein the exit condition comprises:
    exiting if a measured eye height is above a predetermined threshold;
    exiting if a predetermined number of points has been visited;
    exiting if a predetermined time limit has been exceeded; or exiting if each point adjacent to the currently traversed point has a lower eye height than the eye height associated with the currently traversed point.

16. The non-transitory computer-readable medium of claim 10, wherein computing the starting point comprises:
    splitting the map into a plurality of regions;
    measuring the eye height of one point in each region; and
    selecting the point with the highest eye height as the starting point.

17. The non-transitory computer-readable medium of claim 10, wherein computing the starting point comprises:
    iteratively walking along the map of equalization coefficients to at least one new point; and
    testing the set of equalization coefficients represented by the at least one new point.

18. The non-transitory computer-readable medium of claim 17, wherein the starting point is computed when an exit condition has been met.

19. A computing device, including:
    a processor; and
    a memory coupled to the processor and including a software application that, when executed by the processor, configures the processor to:
        compute a metric to determine a starting point from a set of starting points on a map of equalization coefficients, wherein each point on the map comprises a different set of equalization coefficients, the map includes a plurality of regions, and each starting point included in the set of starting points resides in a different region of the map;
    measure an eye height of a signal transmitted using the set of equalization coefficients associated with the starting point and an eye height associated with each adjacent point on the map relative to the starting point, wherein the eye height associated with each adjacent point is based on a signal transmitted using the set of equalization coefficients associated with the adjacent point;
    walk on the map in a first direction from the starting point to the adjacent point associated with the greatest eye height, wherein the eye height associated with the adjacent point is greater than or equal to the eye height associated with the starting point; and
    applying equalization coefficients associated with at least one of the starting point and the adjacent point associated with the greatest eye height to equalize transmissions on the high-speed bus.

20. The computing device of claim 19, wherein the software application, when executed by the processor, further configures the processor to:
    designate the adjacent point associated with the greatest eye height as a currently traversed point; and
    walk on the map in the first direction from the currently traversed point to an adjacent point on the map relative to the currently traversed point, wherein an eye height associated with the adjacent point is greater than or equal to the eye height associated with the currently traversed point.

21. The method of claim 1, wherein a first starting point included in the set of starting points resides at a center of a first region of the map.

22. The method of claim 1, wherein a first starting point included in the set of starting points resides at a pseudorandom location of a first region of the map.

* * * * *

UNITED STATES PATENT AND TRADEMARK OFFICE
CERTIFICATE OF CORRECTION

PATENT NO. : 9,886,402 B2  
APPLICATION NO. : 13/722240  
DATED : February 6, 2018  
INVENTOR(S) : Michael Hopgood et al.

Page 1 of 1

It is certified that error appears in the above-identified patent and that said Letters Patent is hereby corrected as shown below:

On the Title Page

(56) References Cited:

U.S. PATENT DOCUMENTS, please insert --6,614,842 B1 9/2003 Chou et al.--;

Please insert --FOREIGN PATENT DOCUMENTS  
TW    I246272 B    12/2005  
TW    I261229 B    9/2006  
TW    I271051 B    1/2007  
TW    I273801 B    2/2007--.

Signed and Sealed this  
Tenth Day of July, 2018

Andrei Iancu  
*Director of the United States Patent and Trademark Office*